(12) United States Patent
Garyantes et al.

(10) Patent No.: US 6,954,487 B2
(45) Date of Patent: Oct. 11, 2005

(54) TIME DIVISION MULTIPLEXED RAKE FINGER FOR W-CDMA

(75) Inventors: Michael Francis Garyantes, Warren, NJ (US); Yue Lu, Swindon (GB); Lesley Phillip Sabel, Swindon (GB); Steven Andrew Wood, Rownham Mead (GB); Mario Zancan, Bristol (GB)

(73) Assignee: Lucent Technologies Inc., Murray Hill, NJ (US)

( * ) Notice: Subject to any disclaimer, the term of this patent is extended or adjusted under 35 U.S.C. 154(b) by 919 days.

(21) Appl. No.: 09/729,900

(22) Filed: Dec. 5, 2000

(65) Prior Publication Data

US 2001/0036195 A1 Nov. 1, 2001

(30) Foreign Application Priority Data

Dec. 10, 1999 (EP) ............................................. 99309994

(51) Int. Cl.[7] .............................. H03D 1/06; H04L 1/00; H04B 1/69
(52) U.S. Cl. ........................ 375/148; 375/346; 375/348; 375/140
(58) Field of Search ................................ 375/140, 147, 375/148, 150, 316, 343, 346, 348, 130, 142, 143, 144

(56) References Cited

U.S. PATENT DOCUMENTS 5,889,815 A * 3/1999 Iwakiri ....................... 375/148
5,953,366 A * 9/1999 Naruse et al. ............... 375/148
5,953,382 A * 9/1999 Asano et al. ................ 375/347
5,974,038 A * 10/1999 Shou et al. .................. 370/335
6,122,311 A * 9/2000 Watanabe et al. ........... 375/147
6,618,431 B1 * 9/2003 Lee ............................ 375/147

FOREIGN PATENT DOCUMENTS

| EP | 0 691 754 A2 | 1/1996 | ........... H04B/1/707 |
| EP | 0 704 985 A2 | 4/1996 | ........... H04B/1/707 |
| GB | 2 284 129 A | 5/1995 | ........... H04B/7/216 |

OTHER PUBLICATIONS

European Search Report, dated May 15, 2000.

* cited by examiner

Primary Examiner—Chieh M. Fan
Assistant Examiner—Jason M. Perilla

(57) ABSTRACT

A method of recovering transmitted symbols in a receiver of a spread spectrum system, comprising: receiving a signal including multi-path components associated with transmitted symbols; de-spreading successive separate portions of the received signal to provide a symbol estimate based on each multipath component, wherein the de-spreading step comprises determining at least one partial estimate of at least one transmitted symbol for an at least one partial multi-path component contained in a separate portion; and summing the partial estimates of separate portions corresponding to a same transmitted symbol.

14 Claims, 3 Drawing Sheets

TIME DIVISION MULTIPLEXED RAKE FINGER FOR W-CDMA

CROSS-REFERENCE TO RELATED APPLICATION

This application claims priority of European Patent Application No. 99309994.4, which was filed on Dec. 10, 1999.

FIELD OF THE INVENTION

The present invention relates to the implementation of rake fingers for multi-path components in a spread spectrum communication system.

BACKGROUND OF THE INVENTION

So-called rake receivers are currently used to implement the de-spreading function in the receivers of spread spectrum communication systems. The receiver is provided with a plurality of identical rake fingers, each one for de-spreading the plurality of multi-path components which may be associated with a transmitted symbol. Each rake finger is constructed using identical digital logic, and each finger allocated to a different multi-path component at a different received timing offset. The multi-paths are generated by the propagation environment.

One disadvantage of such an arrangement is that a large amount of identical circuitry is used to de-spread the various multi-paths.

It is therefore an object of the present invention to provide an improved technique for despreading multi-path components in the receiver of a spread spectrum system.

SUMMARY OF THE INVENTION

According to the present invention there is provided a method of recovering transmitted symbols in the receiver of a spread spectrum system, comprising: receiving a signal including multi-path components associated with a transmitted symbol; de-spreading successive portions of the received signal to provide a symbol estimate based on each multi-path, wherein at least one multi-path of the transmitted symbol is contained in separate portions, the de-spreading step further comprising determining a partial estimate of the transmitted symbol for the at least one multi-path component based on each part of the multi-path contained in each separate portion; and summing said partial estimates.

The method may further comprise the step, after de-spreading each portion, of storing any partial estimates. The method may further comprise the step, on de-spreading each portion, of retrieving any stored partial estimate associated with a multi-path in the current portion.

The retrieved partial estimate is preferably used in the summing step. The method may further include the step of sampling the received signal at successive time intervals thereby generating the successive portions of the received signal. The method may further comprise the step of estimating a timing error of the received signal, wherein the successive portions of the received signal are time adjusted to compensate for the timing error prior to de-spreading.

The successive portions of the received signal may be stored in a sample memory of N samples. The successive portions of the received signal may have a length of more than one symbol period. The successive portions of the received signal may have a length of two symbol periods. The sample memory may be of any size $N^3 1$. However, as N increases so does the efficiency of the processing. The efficiency of the processing is defined as:

$$h = \frac{N}{N + N_p}$$

where $N_p$ is the number of processing clock cycles used for processing overhead. According to the present invention there is also provided, in a receiver of a spread spectrum communication system, circuitry for recovering transmitted symbols, comprising: sample circuitry, connected to input a received signal including multi-path components of at least one symbol, for sampling successive portions of the received signal; de-spreading circuitry, connected to receive the successive portions of the received signal and for outputting, wherein at least one multi-path of the transmitted symbol is contained in separate portions; determining a partial estimate of the transmitted symbol for the at least one multi-path component based on each part of the multi-path contained in each separate portion; and summing circuitry for summing said partial estimated to produce a full estimate.

The circuitry may further include a memory for storing the partial estimates, wherein at the end of each successive portion of the received signal any partial estimates are stored in said memory.

The circuitry may further include a symbol memory, wherein each full estimate is stored in the symbol memory.

The sample circuitry may include a sample memory, wherein the successive portions of the received signal are stored in the sample memory.

The circuitry may further include timing error detection and estimation circuitry for determining an error in the timing position of the received signal, wherein the timing position of the received signal is adjusted responsive to said error prior to de-spreading.

Thus, according to the present invention, the finger implementation is shared in time for each multi-path. Multiple received signals (or calls), each containing multiple multi-paths, may be processed by the inventive technique. The invention results in minimum complexity and maximum re-use.

DESCRIPTION OF THE PREFERRED EMBODIMENT

Figure 1:
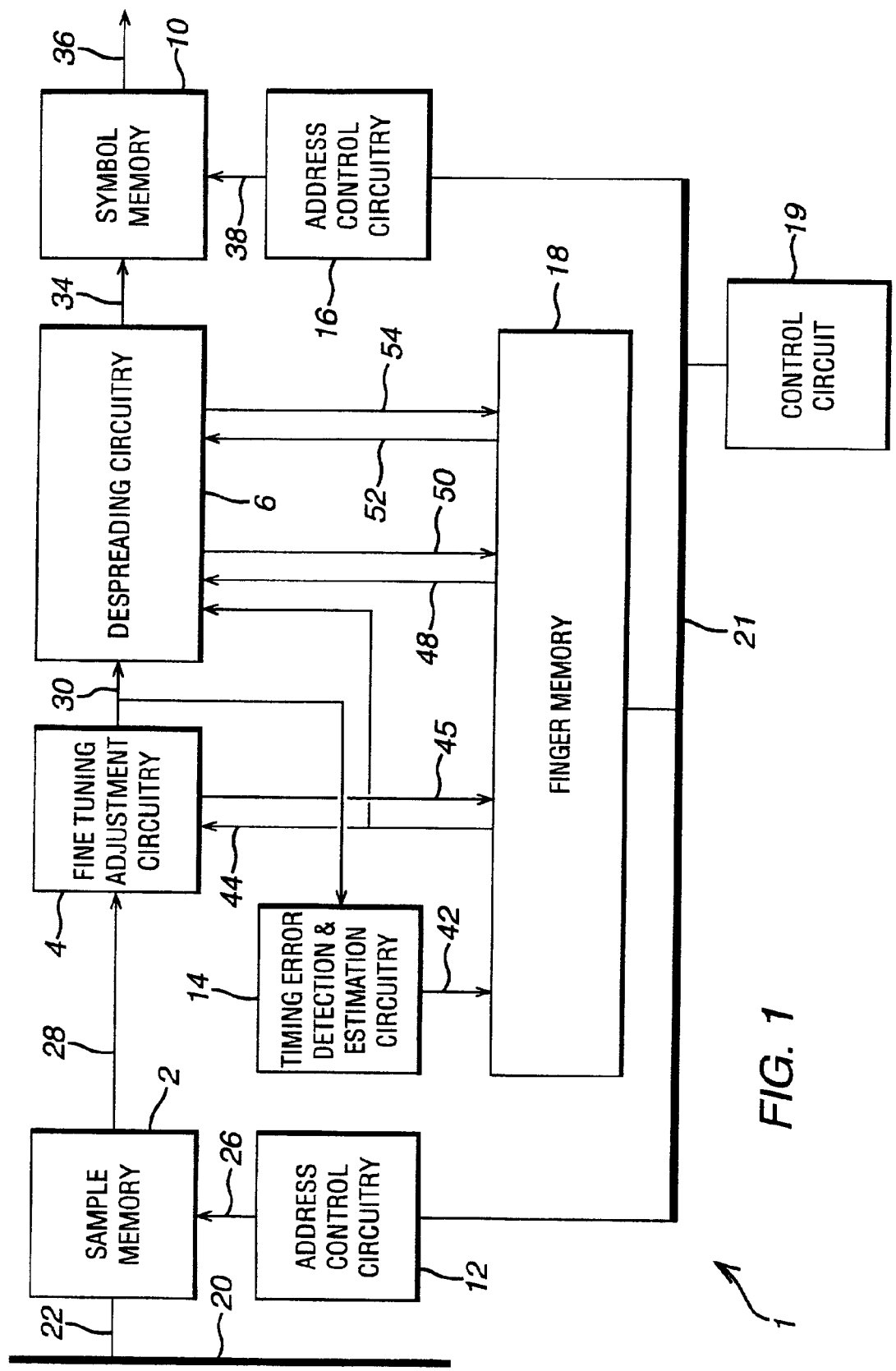
FIG. 1 illustrates a block diagram of a preferred embodiment of a time division multiplexed rake finger according to the invention.

With reference to FIG. 1, the main elements of a time division multiplexed rake finger generally designated by reference numeral 1, according to the present invention, will now be described. The time division multiplexed rake finger comprises a sample memory 2 and associated address control circuitry 12, fine timing adjustment circuitry 4, de-spreading circuitry 6, a symbol memory 10 and associated address control circuitry 16, timing error detection and estimation circuitry 14, a control circuit 19, and a finger memory 18.

The time division multiplexed rake finger 1 is connected to a receive sample bus 20. The receive sample data bus 20 carries received signals at the sample rate of the receiver. All data signals and code signals on the receive sample bus may be complex or real. The received signals form an input to the time division mulitplexed rake finger 1 on line 22 to the sample memory 2.The addressing of the sample memory 2 is controlled by its associated address control circuitry 12 via control and addressing signal lines 26. The sample memory inputs the signals on line 22 from the receive sample data bus 20 and outputs signals onto memory output lines 28 which form inputs to the fine timing adjustment circuitry 4. The inputting and outputting of signals to and from the sample memory is discussed in further detail hereinbelow.

The fine timing adjustment circuitry 4 generates an output signal on line 30 which forms an input to the de-spreading circuit 6. The fine timing adjustment circuitry additionally receives signals from the finger memory 18 on lines 44, and inputs signals to the finger memory on lines 45.

The timing error detection and estimation circuitry 14 receives as an input the signals on line 30 at the output of the fine timing adjustment circuitry 4. The timing error detection and estimation circuitry 14 additionally inputs signals to the finger memory 18 on lines 42.

The de-spreading circuitry additionally sends signals to the finger memory 18 on lines 50 and 54 and receives signals from the finger memory on lines 44, 48 and 52. The de-spreading circuitry 6 generates an output on line 34. The symbol memory 10 receives the signals from the de-spreading circuitry 6 on line 34 as an input, and generates an output on line 36. The inputting and outputting of signals to and from the symbol memory is controlled by the address control circuitry 16 via signal lines 38.

The control circuit 19 generates control signals on a bus 21 for controlling the operation of the time division multiplexed rake finger 1. The address control circuitry 12 and 16, and the finger memory 18, each receive control signals on the control bus 21.

In operation the sample memory is controlled by the address control circuitry 12 to input a sample, or portion, of the received signals on the receive sample bus 20. The received signals at the sample rate of the receiver on the receive sample data bus 20 comprise symbols associated with callers. Information, or symbols, from several callers may be present on the receive sample data bus 20. Multi-paths for each symbol may be present.

According to the present invention, a sample of the receive sample data bus 20 is taken at regular intervals. The sample will capture the signals on the receive sample data bus over a particular, fixed, time period. Each captured sample contains N received signal samples. The sample memory may contain multiple entries of captured samples where each entry is from a different source, e.g. antennas within a sector or different sectors as would be familiar to one skilled in the art of mobile cellular communications. Each captured sample is then processed in the receiver to recover the transmitted signals, as will be described further hereinbelow. Each captured sample may contain partial, full, or multiple symbols from one or more callers, and may contain partial or full multi-paths of one or more symbols.

For the purposes of illustration, the invention is hereafter described with reference to a particular embodiment in which the sample of the received signal that is taken, which is written to the sample memory, is equivalent in length to the time period of two transmitted symbols. Thus the sample is a two-symbol period sample. In the illustrated implementation it is assumed that a single symbol corresponds to 256 chip time periods, and thus the sample that is written into the sample memory corresponds to a sample length of 512 chip time periods.

Figure 3:
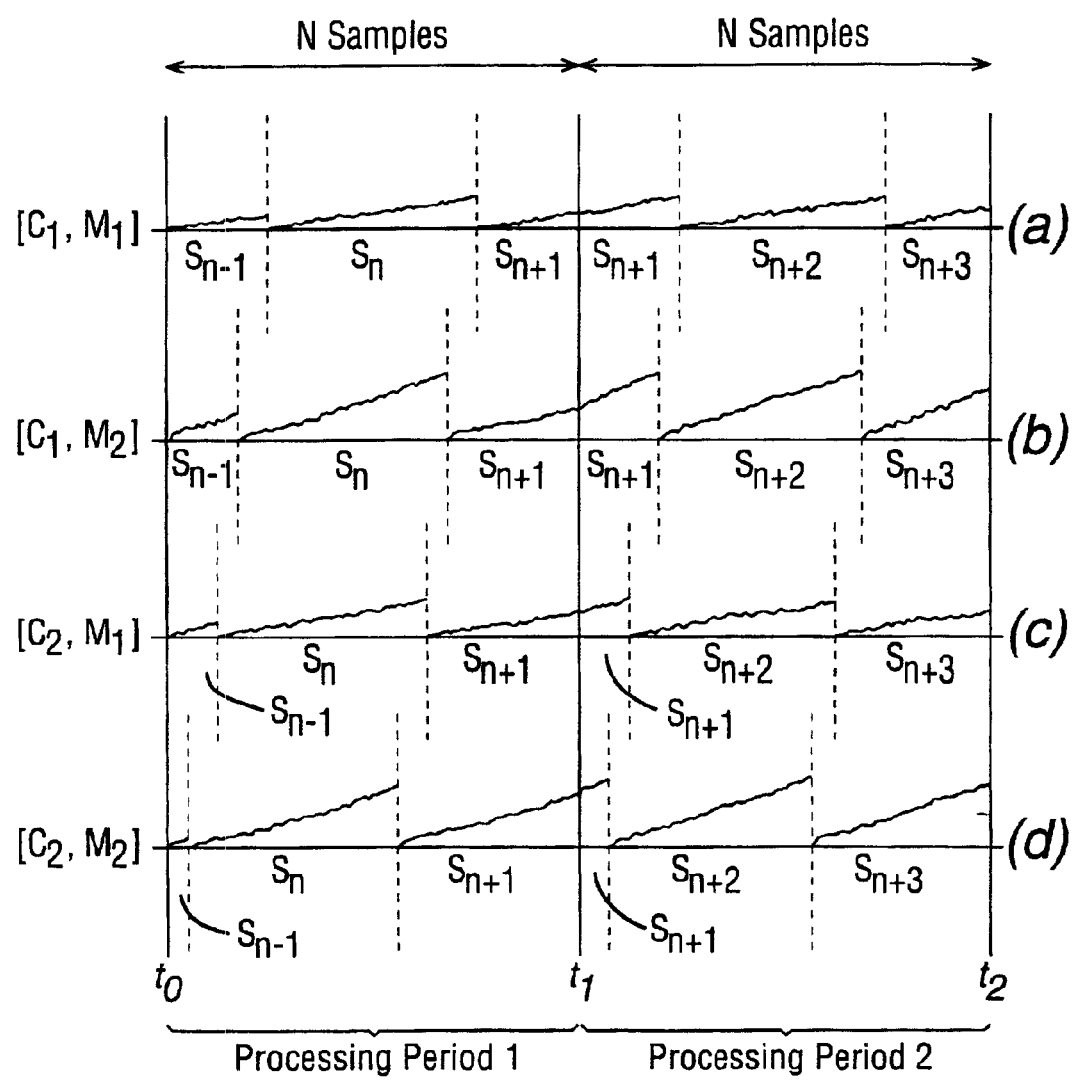
FIGS. 3(a) to 3(d) illustrate the operation of the time division multiplexed rake finger of FIG. 1.

Referring to FIG. 3, the sample written into the memory at various stages of operation is illustrated and used to describe the operation of the time division multiplexed rake finger according to the present invention. Referring to FIGS. 3(*a*) to 3(*d*), there is illustrated the first two symbol period sample written into the sample memory 2. The 512 chip period sample commences at time t0 and ends at time t1.

Also illustrated in FIGS. 3(*a*) to 3(*d*) is the second two symbol period sample written into the sample memory 2 in the next sample period. The second 512 chip period sample commences at time t1 and ends at time t2. Thus the time period t0 to t1 represents a first processing period, and the time period t1 to t2 represents a second processing period. Each of the first and second processing periods contains N samples. FIG. 3(*a*) illustrates the first multi-path of the first caller, [C1,M1]. FIG. 3(*b*) illustrates the second multi-path of the first caller, [C1, M2]. FIG. 3(*c*) illustrates the first multi-path of the second caller, [C2, M1]. FIG. 3(*d*) illustrates the second multi-path of the second caller, [C2, M2]. As will be appreciated, in each processing period further multi-paths associated with each caller may be present and will be processed, and multi-paths associated with further callers may also be present. The four multi-paths shown in FIGS. 3(*a*) to 3(*d*) are representative of the multi-paths which are present, and are sufficient for to provide an understanding of the present invention.

As each sample period corresponds to the length of two symbols, there are potentially two transmitted symbols in the captured sample. However, the sample will not be synchronised to the start of a particular symbol. So, as shown for example in FIG. 3(*a*), at time t0 the last portion of a symbol associated with the (n−1)th symbol of the first multi-path of the first caller is received. The nth symbol Sn of the first multi-path of the first caller is then received in full. Then finally the first part of the (n+1)th symbol of the first multi-path of the first caller is received. Thus the first sample written into the memory in the first processing period include two partial symbols and one full symbol of the first multi-path of the first caller. Similarly for other multi-paths in the first processing period, full and partial symbols are stored in the memory, as exemplified by FIGS. 3(*b*) to 3(*d*).

The timing error estimation circuitry 4 performs operations on the signals on the receive data bus to estimate the location of the start point of all the symbols of the first caller shown in FIG. 3(*a*), and its corresponding multi-paths. The estimate of the starting position for symbols and multi-paths of a particular caller may be recalculated and re-estimated on a regular basis.

Note that the timing circuit is shown here for the purpose of illustration. It may or may not be included in an implementation of the invention. In the case of non-inclusion the timing information is provided by a separate source that has the same format as described herein.

The timing error detection and estimation circuitry 14 generates a fractional error timing signal and a coarse or integer error timing signal. The fractional error timing signal represents the amount, by less than a chip period, that the symbol estimate must be adjusted by, and the integer error timing signal represents the amount, by multiples of a chip period, that the symbol estimate must be adjusted by. These values are calculated by the timing error estimation circuit 14 for all multi-paths of each caller. The fractional error timing signal and the integer error timing signal for all multi-paths of each caller are output on line 42 to the finger memory, and stored in the finger memory 18.

The finger memory has a context associated with each multi-path of each caller. Thus the timing error information (both fractional and integer) associated with each multi-path of each caller is stored with the appropriate context in the finger memory.

The possible implementation of the timing error detection and estimation circuitry 14 will be apparent to one skilled in the art. In operation, the address control circuitry 12 reads stored sample data from the memory, and presents it on lines 28 to the fine timing adjustment circuitry 4. The address control circuitry controls the sample memory to provide the full two-symbol period sample of FIG. 3(a) to the fine timing adjustment circuitry. The two symbol period sample contains, as discussed hereinabove, various multi-paths for various callers as shown by way of example in the first processing period of FIGS. 3(a) to 3(d).

The finger memory 18 is controlled by the control circuit 19 to switch between contexts in accordance with the multi-path currently being processed. The fine timing adjustment circuitry uses the fractional error timing information generated by the timing error detection and estimation circuitry and stored in the finger memory 18 to fractionally adjust the timing of each multi-path in the given processing period.

Referring by way of example to FIGS. 3(a) to 3(d), in a first step the control circuit 19 controls the finger memory 18 to switch its context to output on lines 44 to the fine timing adjustment circuitry 4 the fractional timing information associated with the first multi-path of the first caller. Thus the fine timing adjustment circuitry 4 adjusts the fine timing of the first multi-path of the first caller as shown in FIG. 3(a) in accordance with this timing information. The control circuit 19 then switches the context of the finger memory 18 to output the fractional timing information associated with the second multi-path of the first caller on line 44, to thereby adjust the fractional timing of the signal shown in FIG. 3(b). Similarly the context of the finger memory 18 is switched to provide the necessary fractional timing information on line 44 for each of the other multi-paths to be processed for each caller.

The signal on line 28 at the input to the fine timing adjustment circuitry 4 has a rate of at least two samples per chip. This is necessary to obtain a sample of the received signal which corresponds to the center of the chip period. This ensures that the subsequent de-spreading operation will produce the maximum signal to noise ratio as the correlation gain is maximised. If the number of samples is low, for example two, an interpolator is necessary. If the number of samples is higher an interpolator may not be necessary, because one of the samples is more likely to approximate the peak. A sample selector may then be used. Regardless of the implementation, the output of the fine timing adjustment circuitry 4 on line 30 has a rate of one sample per chip.

Figure 2:
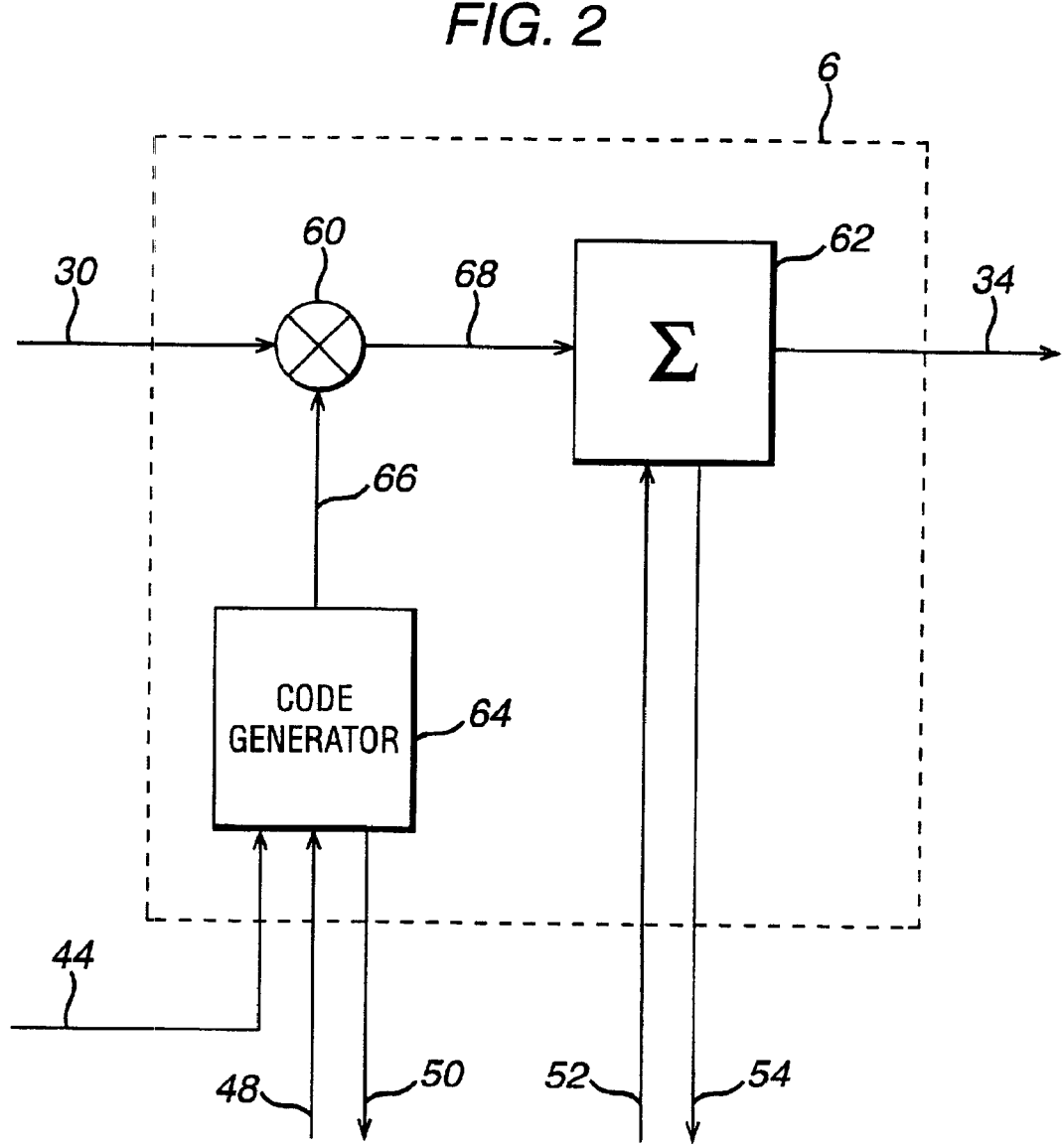
FIG. 2 illustrates an example implementation of the de-spreading circuitry of the time division multiplexed rake finger of FIG. 1.

The fine-time adjusted samples are then provided to the de-spreading circuitry 6 via line 30. An example implementation of the de-spreading circuitry 6 is shown in FIG. 2. The de-spreading circuitry of FIG. 2 includes a multiplier 60, a code generator 64 and a summer 62.

The code generator 64 receives the timing signals from the finger memory 18 on line 44, and receives and transmits the signals on lines 48 and 50 between the de-spreading circuitry 4 and the finger memory 18. The code generator is loaded, from finger memory 18 with the spreading code known to be used by the first caller. The finger memory stores the spreading codes for the different callers. Thus each context in the finger memory 18 will additionally be associated with a spreading code. Under the control of the control circuit 19, the finger memory outputs the appropriate spreading code for the current context on line 48.

In addition the finger memory outputs the integer timing error information associated with that context, and as discussed above stored in the finger memory, on line 44 to the de-spreading circuitry 6.

The code generator 64 then uses the timing information on line 46 to shift the spreading code on line 48 by the necessary amount to be in the estimated same time frame as the multi-path currently being processed.

Thus, referring to the example of FIGS. 3(a) to 3(d), for de-spreading of the first multi-path of the first caller the appropriate context is selected in the finger memory 18, and the timing information output on line 44 and the spreading code output on line 48. The context in the finger memory is thereafter switched to the context for the second multi-path of the first caller, and the appropriate information output on lines 44 and 48. Thereafter, the context is switched to the context for the first multi-path of the second caller, and then the second multi-path of the second caller.

The time shifted spreading code is output on line 66 to the multiplier, and multiplied with the fractional time-shifted sample from the sample memory 2 on line 30. The de-spread signal is then output on line 60 from the multiplier 68 and provided to the summer 62. In a conventional way, the summer sums the de-spread signal to give a first estimate at the receiver of the transmitted symbol based on the first multi-path. The summed result for each multi-path of each caller, comprising the estimate, is output on line 34 to the symbol memory 10.

The de-spread signal on line 34 comprises a received symbol, or partial symbol, at the symbol rate.

As, in general, a symbol boundary will not coincide with the end of a processing period the content of the summer 62 is stored in the finger memory at the end of the partial symbol using lines 54, and then reinstated when that multi-path is to be next processed using lines 52. The partial summed result for a partial symbol is stored in the finger memory in association with the context associated with that multi-path.

For every sample output from the sample memory 2 the control circuit 19, which includes counters, counts the total number of chip periods elapsed and the number of chip periods elapsed for the current symbol. The control circuit 19 counts the number of chips input by the de-spreading circuitry 6 from the start of the particular multi-path being processed. For the nth symbol of the first multi-path of the first caller, as shown in FIG. 3(a), the control circuit 19 will count-up 256 chip periods before the end of the current two-chip period sample is reached. However, as will further be appreciated from FIG. 3(a), for the (n+1)th symbol the control circuit 19 will not count to 256 before the end of the current two-chip sample period is reached, and this will indicate that the whole of the (n+1)th symbol has not been sampled. How the time division multiplexed rake finger according to the present invention deals with this will now be explained.

The de-spreading circuitry de-spreads the symbols in successive multi-paths for successive calls.

In the first processing period, referring to FIG. 3(a), the first multi-path associated with the nth symbol is fully contained within the sample period of FIG. 3(a). After processing this multi-path, the time multiplexed rake finger proceeds to process the first multi-path of the (n+1)th symbol from the first caller, which is identified as being the next received sample.

The sample is provided to the fine timing adjustment circuitry and then to the de-spreading circuitry, with the appropriate timing information being provided on lines 44.

As is clear from FIG. 3(a) the first sample stored in the sample memory includes only part of the (n+1)th symbol of the first multi-path of the first caller. The control circuit 19 the number of chip periods of the (n+1)th symbol which are provided to the de-spreading circuitry. The de-spreading circuitry performs a partial de-spreading of the (n+1)th symbol based on the portion of the symbol that is available.

The result of the partial de-spreading of the (n±1)th symbol of the first multi-path of the first caller is output on line 54 to the finger memory. This partial result is stored in the finger memory in association with the context corresponding to the (n+1)th symbol of the first multi-path of the first caller. In addition, the unused portion of the spreading code in the code generator 64 is stored in the finger memory via lines 50 in association with the context.

Within the first processing period, the other symbols present for different multi-paths and different callers are processed in a similar way. Referring to the example of FIGS. 3(a) to 3(d), at the end of the first processing period the finger memory will additionally include partial de-spreading results associated with the second multi-path of the (n+1)th symbol of the first caller, the first multi-path of the (n+1)th symbol of the second caller, and the second multi-path of the (n+1)th symbol of the second caller.

When the end of the sample is reached the contents of the registers of the de-spreading circuitry are thus stored in the finger memory 18 with an association to the appropriate symbol of the appropriate multi-path of the appropriate caller. The control circuit 19 counts the number of chip periods processed for each partially de-spread symbol, and this value is stored in the finger memory 18 along with an association to the appropriate context. Once the first two-symbol period sample captured by the memory has been processed as above, the second two-symbol period sample captured by the memory is processed in a similar manner. The second two-symbol sample period is also illustrated in FIG. 3(a) to 3(d). As can be seen, the second sample includes the continuation of the sample in the first processing period. The second processing period includes, referring to FIG. 3(a), the final portion of the (n+1)th symbol of the first multi-path of the first caller, referring to FIG. 3(b) the final portion of the (n+1)th symbol of the second multi-path of the first caller, referring to FIG. 3(c) the final portion of the (n+1)th symbol of the first multi-path of the second caller, and referring to FIG. 3(d) the final portion of the (n+1)th symbol of the second multi-path of the second caller.

The two-symbol sample period including all the multi-paths of all callers of the second processing period is transferred on line 28 to the fine timing adjustment circuitry 4.

In a first step, the first multi-path of the first caller in the second processing period is processed. The first part of this multi-path is the final portion of the (n=1)th symbol, the first part of which was processed in the first processing period.

The fractional timing information stored in the finger memory for the first multi-path of the first caller is output on line 44 to the fine timing adjusted circuitry 4, and the thus time adjusted sample output on line 30. Similarly, referring to the examples of FIGS. 3(a) to 3(d) the context in the finger memory is changed for the processing of the second multi-path of the first caller, the first multi-path of the second caller, and the second multi-path of the second caller.

The thus time adjusted multi-paths are then de-spread in the de-spreading circuitry 6. For the first multi-path of the first call, as shown in FIG. 3(a), the first symbol to be de-spread is the last portion of the (n+1)th symbol. In order to despread the (n+1)th symbol, the partial result formulated in the previous processing period and stored in the finger memory needs to be used. The context of the finger memory 18 is switched to the (n+1)th symbol of the first multi-path of the first caller, and the stored information associated with that context output form the finger memory on lines 44 and 52. Thus the stored integer timing information is provided to the code generator 64. In addition, the remaining portion of the spreading code for the symbol is provided on line 48 to the code generator 64. The partial summer result from the previous processing period is provided on line 52 and loaded in the summer 62.

The control circuit 19 is loaded with the counter values for the (n+1)th symbol of the first multi-path of the first caller which is also previously stored in the finger memory 18 in association with the corresponding context.

The de-spreading circuitry de-spreads the final portion of the first multi-path of the (n+1)th symbol of the first caller and outputs the final summed value on line 34, and presented for storage in the symbol memory 10.

The remainder of the two-sample period of the first multi-path of the first caller is then processed. The (n+2)th symbol is processed in the same way as the nth symbol in the first processing period. The (n+3)th partial symbol is processed in the same way as the (n+1)th partial symbol in the first processing period.

This operation is then repeated for the second multi-path of the first caller as shown in FIG. 3(b), and for the other multi-paths shown in FIGS. 3(c) and 3(d).

The completed multi-path symbol estimates output on line 34 from the de-spreading circuitry are stored in the symbol memory 10 under the control of the address control circuitry, which is in turn controlled by the control circuitry 19.

The multi-path symbol estimates stored in the symbol memory 10 are subsequently read out onto line 36 under the control of the address control circuitry 16 for further processing, such as the combining of multi-paths associated with the same symbol (maximum ratio combining).

In the example implementation given hereinabove the time division multiplexed rake finger uses a sample memory, or buffer, which stores only two minimum rate symbol periods of signal data.

A typical use of the invention may be in the implementation of a rake receiver for wireless CDMA cellular systems such as Universal Mobile Telecommunications Standard (UMTS). In UMTS the minimum rate symbol period of signal data is 256 chip periods. However UMTS uses a variable spreading code. Therefore other numbers of complete symbols could be received in a 512 chip time period in addition to the two partial symbols. For example there are symbols which are only 32 or 64 chip periods long.

It will be appreciated that in a real implementation the time division multiplexed rake finger of FIG. 1 is duplicated, because the received signals are complex and therefore there are two processing 'legs': one for the I channel and one for the Q channel.

In effect the finger memory 18 can be considered to comprise n finger memories, corresponding to the n fingers which would normally be required, each associated with one of n multi-paths. The updating of the register values in the time division multiplexed rake finger from the memory 18 is termed context switching.

The secondary summing function provided by the context switching of the contents of the de-spreading circuitry 6 solves the problem of the small quantity of the received signal in the sample memory being rarely synchronised with the received signal symbol timing. Even if one multi-path had time alignment between the received signal and the sample memory, the other multi-paths would not.

The primary benefit of the time division multiplexed rake finger according to the invention is its low hardware complexity relative to the implementation of multiple rake receivers each with multiple fingers. The time division multiplexing may be used for multiple channels (or multiple callers), the limit being dependent on the number of fingers used for each channel and the processing clock rate. This gives a distinct advantage as channel elements which are designed for high rate channels may also be used to process multiple low rate channels, hence improving efficiency significantly in terms of both hardware implementation cost and occupied area. In addition, the time division multiplexed rake finger of the invention allows considerable flexibility over conventional designs as the fingers may be assigned dynamically dependent on the number of multi-paths present on a call at a particular instant in time.

In the following, an analysis is given of the processing and memory dimensions required for a particular implementation. These dimensions are in no way limiting of the invention, but are given by way of aiding further understanding of the invention.

Given a processing clock rate fp, a chip rate of rc, N signal samples per processing period, and a processing overhead of Np processing periods, the 'number' of rake fingers Nf which can be supported in the time division multiplexed rake finger is:

$$Nf = \text{Int}[N. fp/((N+Np)*rc)]$$

where Int[.] is the integer part of the argument.

By way of example, let fp=100 MHz, rc=4.096 MHz, N=256 and Np=14. The result is Nf=23. Generally 8 fingers can be considered to be satisfactory. This particular scenario enables almost 3 channels (8+8+7 fingers) to be supported.

Where time is required for other processing tasks, that time must be subtracted from the processing clock rate prior to performing the above calculation. For example if time is required for the reading of the sample RAM for synchronisation calculations, the clock rate may be scaled given the overhead of one buffer read per processing period. Hence the clock rate may be scaled to:

$$fp = fp - \max\left(\frac{N - Ns}{N}\right)$$

Using the values from the above example and Ns=14, a result of fp=94.53 MHz is obtained. The number of supportable fingers is then 21.

The structure shown in FIG. 1 consists of an input signal bus 20 which feeds the sample memory 2. The sample memory may be a dual port RAM (DPRAM) or a static RAM (SRAM) which operates at double rate to allows both read and write cycles from the same port (or address and data bus).

Such a RAM may be implemented as two blocks of SRAM (one each for read and write cycles which are interchanged at the end of each processing period) or as a single DPRAM. The sample RAM size in bits is N×the number of sources (antennas)×2 buffers×L samples per chip period×B bits per signal sample×2 (I/Q).

The symbol memory 10, may be implemented as a DPRAM, and is preferably dimensioned on a time-slot (TS) basis where the maximum number of bits per TS is 80 (i.e. DTCH120). Hence a typical requirement is for 80×2 timeslots×2 channels×8 fingers/channel×2 I/Q=5120 bytes, where each I/Q output symbol is assumed to be quantised to 8 bits.

The memory size for the receive sample buffer is significantly smaller than that which would be required for frame period processing (typically 1M byte) or timeslot processing (typically 61.44 kbytes). The memory size for the symbol buffer is typically dimensioned for timeslot processing

What is claimed is:

1. A method of recovering transmitted symbols in a receiver of a spread spectrum system, comprising the steps of: receiving a signal including multi-path components associated with transmitted symbols; and de-spreading successive separate portions of the received signal to provide a symbol estimate based on each multi-path component, wherein: each said successive separate portion contains at least one complete multi-path component of the transmitted symbols and at least one partial multi-path component of the transmitted symbols; the de-spreading step comprises determining, for each partial multi-path component, one partial symbol estimate associated with a one of the transmitted symbols; and the method further comprises summing, over two or more said successive separate portions, the partial symbol estimates corresponding to a same one of the transmitted symbols.

2. The method of claim 1 further comprising the step, after de-spreading each successive separate portion, of storing any partial estimates.

3. The method of claim 2 further comprising the step, on de-spreading each successive separate portion, of retrieving any stored partial estimates assoicated with a same transmitted symbol in the current portion.

4. The method of claim 3 wherein the any retrieved partial estimates are used in the summing step.

5. The method of claim 1 further including the step of sampling the received signal at successive time intervals thereby generating the successive separate portions of the received signal.

6. The method of claim 5 further comprising the step of estimating a timing error of the received signal, wherein the successive separate portions of the received signal are time adjusted to compensate for the timing error prior to de-spreading.

7. The method of claim 6 wherein the successive separate portions of the received signal are stored in a sample memory.

8. The method of claim 7 wherein the successive separate portions of the received signal have a length of more than one symbol period.

9. The method of claim 8 wherein the successive separate portions of the received signal have a length of two symbol periods.

10. In a receiver of a spread spectrum communication system, circuitry for recovering transmitted symbols, comprising: sample circuitry, connected to input a received signal including multi-path components of at least one symbol, for sampling successive separate portions of the received signal, each said successive separate portion containing at least one complete multi-path component of the transmitted symbols and at least one partial multi-path component of the transmitted symbols; de-spreading circuitry, connected to receive the successive separate portions of the received signal and for outputting a symbol estimate by determining, for each partial multi-path component, one partial symbol estimate associated with a one of the transmitted symbols and summing circuitry for summing, over two or more said successive separate portions, the partial symbol estimates corresponding to a same one of the transmitted symbols, thereby to produce a full estimate.

11. The circuitry of claim 10 further including a memory for storing the partial estimates, wherein at the end of de-spreading each successive separate portion of the received signal, any partial estimates are stored in said memory.

12. The circuitry of claim 11 further including a symbol memory, wherein each full estimate is stored in the symbol memory.

13. The circuitry of any claim 12 wherein the sample circuitry includes a sample memory, wherein the successive separate portions of the received signal are stored in the sample memory.

14. The circuitry of claim 13, further including timing error detection and estimation circuitry for determining an error in the timing position of the received signal, wherein the timing position of the received signal is adjusted responsive to said error prior to de-spreading.

* * * * *